United States Patent [19]
Strobel et al.

[11] 4,279,937
[45] Jul. 21, 1981

[54] LIQUID EXTRACT DECAFFEINATION WITH BENZYL ALCOHOL CONTAINING MIXTURES

[75] Inventors: Rudolf G. K. Strobel, Cincinnati; Richard A. Eich, Oxford, both of Ohio

[73] Assignee: The Procter & Gamble Co., Cincinnati, Ohio

[21] Appl. No.: 814,618

[22] Filed: Jul. 11, 1977

Related U.S. Application Data

[63] Continuation of Ser. No. 681,632, Apr. 29, 1976, abandoned.

[51] Int. Cl.$^3$ .......................... A23F 3/38; A23F 5/22; A23G 1/00
[52] U.S. Cl. ...................................... 426/424; 426/428
[58] Field of Search ................ 210/511; 426/428, 424, 426/429, 594; 260/250

[56] References Cited
U.S. PATENT DOCUMENTS

| | | | |
|---|---|---|---|
| 2,472,121 | 6/1949 | Ornfelt | 426/428 X |
| 2,817,588 | 12/1957 | Barch | 426/428 |
| 3,361,571 | 1/1968 | Nutting et al. | 426/428 X |

OTHER PUBLICATIONS

"The Existence of Compounds Between Xanthine Derivatives and Solubilizing Agents," Reiss, Arzneimittel-Forsch, 11, #7, pp. 669–671 (1971).

Primary Examiner—Joseph M. Golian
Attorney, Agent, or Firm—Jerry J. Yetter; Rose Ann Dabek; Richard C. Witte

[57] ABSTRACT

Liquid coffee extracts are decaffeinated using a solvent system which comprises benzyl alcohol.

10 Claims, No Drawings

LIQUID EXTRACT DECAFFEINATION WITH BENZYL ALCOHOL CONTAINING MIXTURES

This is a continuation of application Ser. No. 681,632 filed Apr. 29, 1976, now abandoned.

BACKGROUND OF THE INVENTION

The present invention relates to a process for decaffeinating coffee extracts, and the like. More particularly, liquid coffee extracts, and the like, are decaffeinated using solvent systems which comprise benzyl alcohol.

In coffee decaffeination processes, either the beans, themselves, or extracts prepared from roasted coffee beans are contacted with solvents which dissolve and remove the caffeine. A wide variety of solvent systems have been suggested for use in the decaffeination of coffee. For the most part, such solvents comprise either single-phase organic liquids or two-phase mixtures of an organic liquid and water. Other art-disclosed processes involve the use of elevated temperatures and pressures in conjunction with solvents to promote rapid dissolution of the caffeine and its extraction from whole coffee beans.

A major problem with many potential decaffeination solvents is their ability not only to solubilize caffeine, but also to dissolve and remove important organic materials which account for the familiar coffee aroma and flavor. Of course, removal of such materials by a decaf solvent is preferably avoided to the extent possible.

The chlorinated hydrocarbon solvents are currently being used by most producers of decaffeinated coffee since they are cheap, relatively volatile, and rather easily recovered, once appropriate plant facilities are built. While caffeine is not particularly soluble in the chlorinated hydrocarbon solvents, as compared with other types of solvents, the economic advantage of the chlorinated hydrocarbons must be presumed, since they are in such wide commercial use. Importantly, the chlorinated hydrocarbons leave sufficient quantities of the flavor and aroma materials in the coffee so that decaffeinated coffee beverages with adequate (but suboptimal) flavor and aroma levels are secured.

The history of current government regulations indicates that there is some concern on the part of health care specialists regarding the use of chlorinated hydrocarbons to decaffeinate coffee. Residual levels of materials such as trichloroethylene have been judged to be intolerable in decaffeinated coffee, and the use of this material as a decaf solvent has recently been brought into question.

As can be seen from the foregoing, it would be advantageous to be able to remove caffeine from coffee without the need for chlorinated hydrocarbon solvents. Moreover, it would be highly desirable to use, as a decaffeination means, a caffeine solvent which is generally recognized as safe (GRAS) for food use. The use of a GRAS material as a solvent to decaffeinate coffee would alleviate any concerns about untoward physiological effects on the users of decaf products even if minor traces of the solvent were to remain therein.

It has now been determined that solvent systems comprising benzyl alcohol (a GRAS material) are quite effective in removing caffeine from coffee, and the like. Moreover, use of the benzyl alcohol systems does not result in unacceptable losses of organoleptically desirable flavor and aroma materials. Accordingly, the present invention provides a process for decaffeinating coffee, and like caffeine-containing materials, which employs benzyl alcohol as a caffeine solvent.

PRIOR ART

The use of a variety of solvents to decaffeinate coffee beans is reported in the literature. For example, U.S. Pat. No. 1,629,512 (Kundig; 1927) teaches solvents such as benzene, carbon tetrachloride, and alcohols such as propyl alcohol, allyl alcohol, as well as esters of nitric acid, etc., for decaffeinating coffee beans.

U.S. Pat. No. 2,391,981 (1946; Kremers) discloses methyl alcohol, ethyl alcohol, acetone, amines, etc., for decaffeinating coffee beans.

U.S. Pat. No. 3,682,648 (1972; Mitchell, et al.) discloses the decaffeination of green coffee beans using solutions of various edible esters, such as the acetic acid esters of propylene glycol or glycerol. The beans are swollen with water to promote decaffeination.

Various United States, German, British, French and Belgian patents relate to various solvent systems used in decaffeination processes. In general, these solvents are aliphatic alcohols, acetone, various chlorinated hydrocarbons, tribasic acids, benzene, gasoline, etc. Among these are U.S. Pat. Nos. 950,357; 2,016,634; 2,324,594; 2,335,206; 3,749,584; 2,817,588; 1,000,692; German Pat. Nos. 1,807,308; 1,492,744; 1,805,391; British Pat. No. 871,984; French Pat. No. 739,527; and Belgian Pat. No. 763,797.

The article by R. Reiss, entitled "The Existence of Complexes Between Xanthine Derivatives and Solubilizing Agents" appearing in Arzneimittel-Forsch, 11, #7, 669-71 (1971) reports data which are said to indicate the existence of complexes formed between caffeine and benzyl alcohol.

The solubility of caffeine in a wide variety of solvents has been reported in the literature. In the main, the solvent systems do not appear to be disclosed for use in decaffeinating coffee beans, but rather as part of a general investigation into the mode of drug action of caffeine and a variety of related compounds having interesting pharmacological/biological activities. For example, the text SOLUBILITIES OF ORGANIC COMPOUNDS, Seidell, Vol. 11, 1941, at page 613, describes the solubility of caffeine in a wide variety of organic solvents, including, for example, benzaldehyde.

The solubility of caffeine in several solvents, with-and-without additives such as sodium benzoate, appears in the Merck Index, 8th Ed. (1968) at page 188. Beilstein's Handbook also reports the solubility of caffeine in various solvent systems under the heading "KAFFEIN" (Beilstein 1937; 1938; 1954; see also the solubility of caffeine as reported in the HANDBOOK OF CHEMISTRY AND PHYSICS and the DICTIONARY OF ORGANIC COMPOUNDS.)

The solubility of caffeine and various xanthine materials is reported in multiple entries throughout CHEMICAL ABSTRACTS.

SUMMARY OF THE INVENTION

The present invention encompasses a process for decaffeinating liquid coffee extracts (or like caffeine-containing materials such as extracts from cocoa beans, cola nuts, tea, and the like) comprising contacting said extracts with a solvent system comprising benzyl alcohol, and thereafter removing the decaffeinated extract from contact with the solvent system.

In an optional mode, flavor and aroma materials are first removed from the balance of the extract, for example in the manner described in U.S. Pat. No. 3,717,472, Strobel, issued Feb. 20, 1973, the disclosures of which are incorporated herein by reference. The balance of the extract can then be decaffeinated using benzyl alcohol in the manner described herein without fear of losing any flavor or aroma. The decaffeinated extract is thereafter recombined with the flavor and aroma materials, optionally in the manner disclosed in U.S. Pat. No. 3,769,032, to Lubsen, Strobel, Reinhart and Patel, issued Oct. 30, 1973, the disclosures of which are incorporated herein by reference.

It will be appreciated that the coffee extracts and other extracts which are decaffeinated by the instant process are the products of steeping roasted coffee beans, or like caffeine-containing materials, in water. The water extract is then used in the decaf process herein. The process is thus distinguished from the extraction of coffee beans or dried coffee extracts or other caffeine-containing materials, as disclosed in the concurrently-filed application of Strobel and Eich, entitled "DECAFFEINATION PROCESS", Ser. No. 681,869, filed Apr. 29, 1976, now abandoned, and the concurrently-filed application of Strobel and Eich, entitled "DRY EXTRACT DECAFFEINATION PROCESS", Ser. No. 681,633, now abandoned, filed Apr. 29, 1976, since the extracts used herein have been fully "brewed", or extracted, prior to their decaffeination and are in the liquid state.

DETAILED DESCRIPTION OF THE INVENTION

The process of this invention employs benzyl alcohol ($C_6H_5CH_2OH$) as a decaffeinating solvent for use with liquid (especially aqueous) coffee extracts, and the like. The high solubility of caffeine and the relatively low solubility of flavor materials in benzyl alcohol make this solvent especially useful in decaffeination processes.

Liquid benzyl alcohol, alone, can be used in the present process for decaffeinating liquid extracts such as aqueous coffee brews. However, benzyl alcohol tends to form emulsions with the aqueous extracts so that clean separations are somewhat difficult to achieve. To overcome this problem, the benzyl alcohol can optionally and preferably be used in combination with an appropriate, miscible organic "thinner" solvent to provide a solvent system which more rapidly and completely separates from the aqueous extract being decaffeinated.

The process of this invention is carried out by contacting the liquid extract to be decaffeinated with the solvent system comprising benzyl alcohol for a time sufficient to effect removal of the caffeine to the degree desired. It will be appreciated that the contact time used will depend to some extent on the amount of caffeine originally present in the extract, the ratio of extract:solvent system employed, the decaffeination temperature and pressure, and like factors well recognized in the decaffeination arts. In any event, an appropriate contact time can be determined without undue effort by the user of the process herein. Of course, the amount of caffeine removed from a given extract can be readily estimated by quantitative analyses of the caffeine content of the extract being treated and the caffeine content of the solvent system at various times during the extraction process.

The decaffeination can be carried out at temperatures below or above the boiling point of the benzyl alcohol solvent system, or the aqueous extract. The boiling points of the solvent system and aqueous extracts will depend on the pressure employed in the decaf process. The decaf process can be carried out using pressures in excess of atmospheric, but this is not necessary to achieve excellent decaffeination with the benzyl alcoholbased solvent systems. For most purposes, the decaf process is carried out at pressures of about 1-5 atmospheres. In general, temperatures in the range from about 20° C. to about 125° C. are employed.

Following contact of the caffeine-containing liquid extract with the solvent system for a time sufficient to achieve the desired degree of decaffeination, the extract is removed from contact with the solvent system. With liquid extracts employed herein, the solvent system phase is simply allowed to separate from the liquid extract phase. As noted, phase separation is enhanced by the presence of one or more water-immiscible organic thinners in the solvent system.

At this point in the process, a finite quantity of the benzyl alcohol may remain in the liquid extract. While generally recognized as safe for ingestion, benzyl alcohol is organoleptically undesirable in coffee beverages, and the like. This benzyl alcohol can conveniently be removed from the extract by washing with one or more portions of the liquid thinners herein, or with any other suitable solvent for benzyl alcohol.

Accordingly, when decaffeinating liquid, aqueous extracts using benzyl alcohol or a solvent system comprising benzyl alcohol, residual traces of benzyl alcohol can be removed from the decaffeinated liquid extract using a water-insoluble thinner solvent of the type disclosed herein. Following usual liquid-liquid extraction techniques, the decaffeinated aqueous extract containing traces of the benzyl alcohol is shaken, stirred, or otherwise contacted with a water-immiscible thinner solvent and the phases are allowed to separate. This procedure can be repeated until substantially all of the benzyl alcohol is partitioned into the thinner solvent, and removed.

The thinners for benzyl alcohol useful herein are organic liquids which are miscible with the benzyl alcohol and form a homogeneous, single-phase, substantially water-insoluble solvent system therewith. The solvent thinner for the benzyl alcohol need not be a solvent for caffeine, although thinners which are also solvents for caffeine are not excluded from the practice of this invention. For example, ethyl acetate, which is a relatively good solvent which has been suggested for use in extracting caffeine from coffee beans, is miscible with benzyl alcohol and is useful for adjusting the viscosity of the benzyl alcohol and for washing the decaffeinated extracts to remove organoleptically undesirable traces of benzyl alcohol.

A variety of common organic solvents are not useful as the thinner herein inasmuch as they do not form a homogeneous mixture with benzyl alcohol. For example, solvents such as benzene, hexane, heptane, and petroleum ether are not suitable for use as a thinner for the benzyl alcohol.

Representative examples of materials which do form a homogeneous solution with benzyl alcohol and which are especially useful herein include the xylenes, ethyl acetate, cyclopentane and cyclohexane.

Other organic liquids which are miscible with benzyl alcohol and are suitable for use as the thinners herein include: pyridine, acetic acid, 1-butanol, ethylene glycol, 2-nitropropane, 1-nitropropane, n-butyl acetate, toluene, nitroethane, nitromethane, benzaldehyde, acetone, isopropyl acetate, acetonitrile, acetone, ethyl ether and isopropyl ether.

Another consideration with the choice of thinner solvent relates to the solubility of flavor and aroma materials therein. Of course, it is highly preferred to use thinners which do not substantially dissolve and remove such materials from the extracts being decaffeinated. Cyclopentane, cyclohexane and the xylenes (ortho, meta, para and mixtures) are useful in this regard, with cyclopentane and cyclohexane being especially preferred.

Mixed solvent systems herein generally comprise a mixture of benzyl alcohol and a thinner at a weight ratio in the range from about 10:90 to about 90:10. Preferred are solvents wherein the benzyl alcohol and thinner are used at a weight ratio of benzyl alcohol:thinner in the range from about 70:30 to about 60:40. Highly preferred solvent systems herein comprise benzyl alcohol/cyclohexane and benzyl alcohol/cyclopentane at a weight ratio of benzyl alcohol:cycloalkane in the range from about 70:30 to about 60:40.

As disclosed hereinabove, the decaffeination can be carried out at any desired temperature commensurate with the boiling point of the solvent system. However, it is preferred, and convenient, to perform the decaffeination at a temperature in the range from about 40° C. to about 60° C.

The time period used to decaffeinate the extracts will vary, depending on the factors discussed hereinabove. For most purposes, the contact time between a coffee extract and the solvent system will be in the range from about ½ hour to about 24 hours, although shorter times can be used, especially when fresh solvent is continuously passed through the extract as, for example, in a column.

In a batch-wise decaffeination process, the weight ratio of the solvent system to extract is generally in the range from about 1:1 to about 10:1, with a 5:1 ratio being average.

As can be seen from the foregoing, the process of this invention can be carried out by simply brewing roasted coffee beans, or like caffeine-containing materials, in water and thereafter decaffeinating the liquid extract using the benzyl alcohol solvent system disclosed herein. In an alternate mode, aroma- and flavor-bearing substrates such as roasted coffee beans, and the like, are separated into an aroma concentrate and a flavor concentrate by pulsing or applying in a continuous fashion wet steam to a zone containing the substrate. The substrate-containing zone is held under vacuum pressure and the flavor concentrate is collected in a first cooled trap, while an aroma concentrate is collected in a second, still colder, trap. The substrate can thereafter be removed from the extraction zone and brewed with hot water to provide a substantially flavorless, non-aromatic, aqueous caffeine-containing extract. This extract is thereafter decaffeinated using the benzyl alcohol solvent system herein and then re-combined with the flavor and aroma concentrates.

In still another mode, aroma- and flavor-bearing substrates such as roasted coffee beans, and the like, are separated into the aroma and flavor concentrates in the general manner disclosed immediately hereinabove. The spent substrate is thereafter discarded. A second portion of aroma- and flavor-bearing substrate, such as roasted coffee, is brewed using hot water in standard fashion. The brewed coffee is thereafter decaffeinated using benzyl alcohol in the manner disclosed hereinabove and then enriched by adding portions of the separately-prepared aroma and flavor concentrates, as needed, to provide a full-bodied, aromatic coffee beverage with little caffeine.

The following description of this optional mode of practicing the invention is given in the context of utilizing roast and ground coffee; however, this process has a wider utility than use with coffee, and can be applied to any caffeine-containing food substrate, including those previously mentioned.

Roast and ground coffee is charged into a substrate-containing zone which, if desired, can be an extraction column. The substrate-containing zone, i.e., the roast and ground coffee column, is placed in communication with at least two in-line condensing traps. The first trap is held at temperatures in the range of from −20° C. to −76° C. by a convenient cooling medium such as Dry Ice. The second trap is cooled by liquid nitrogen to a temperature in the order of −195.8° C. The entire system is held under vacuum by a vacuum pump. Preferably, prior to commencing the flavor and aroma extraction, the system is purged of oxygen by flushing with an inert gas. This flushing of the system with an inert gas prior to commencement of the flavor and aroma extraction is preferred in order to remove oxygen from the system because oxygen within the system contributes to the rapid development of impaired flavor and aroma.

While not critical to this step, but preferred from the standpoint of development of the best flavor and aroma concentrates, the roasted coffee can, prior to grinding and flavor and aroma extraction, be subjected to liquid nitrogen freezing. Such preparation of the roasted coffee prior to any size reduction minimizes formation of free radicals which can deteriorate subsequently separated aroma and flavor concentrates. Free radical formation in the absence of substrate freezing may occur during typical mechanical stress actions such as grinding, flaking, and other size reduction techniques.

Wet steam is passed either in a pulsing fashion or a slow continuous fashion through the roast and ground coffee. It is important to note that the wet steam must be passed in a slowly, i.e., pulsed or slow continuous addition, through the roast and ground coffee-containing zone. In the event the wet steam is allowed to flood the entire roast and ground coffee-containing zone rapidly, the flavor constituents and the aroma constituents are not adequately separated. While not critical, it is preferred in order to carry color-forming bodies and color precursors through the system that the process be carried out in a downward fashion. However, upward introduction of wet steam can also be employed.

In actual practice wet steam per se is not directly introduced into the column, but rather hot water is used. However, because of the vacuum conditions within the column, the water rapidly evaporates to provide cold steam. Since the roasted coffee zone is usually cooled by a cooling jacket, some of the steam rapidly condenses on the roasted coffee. It is in the context of this description that the term "wet steam" is used herein.

For example, hot water near 100° C. is introduced into the top of the roast and ground coffee-containing zone. The first pulse should comprise only a sufficient amount of steam to wet a first small portion of the column. Generally, this will comprise a first one-tenth to one-eighth of the column. When the first steam pulse is introduced it rapidly comes into contact with the roast and ground coffee which is usually at lower temperatures than the steam. Immediately upon contact with the steam the most highly volatile aroma materials are desorbed from the substrate and by operation of gravity, the influence of the vacuum, and the continual sparging in a downward manner by an inert gas where such is employed, are carried downward through the column.

Once the first pulse of steam hits the coffee and the most highly volatile materials are desorbed, the steam condenses onto the surface of the coffee particles and begins to soak into the particles. This in turn causes more gas desorption and likewise these aroma-bearing essences are driven down further into the column. Finally, the water saturates the outermost portions of the particles and, because of the vacuum conditions, water begins to evaporate from the outside of the particles and forms cold steam. In this manner the water-soluble flavor constituents are transported to the outer particle surface from where they can be stripped away with the next pulse of wet steam.

After subjection to the first pulse of wet steam there will be a readily visible interface between the dry coffee particles which have not been subjected to cold wet steam and those particles which have been subjected to cold wet steam. This interface will comprise in appearance a dark color band because of the presence of color-bearing bodies. With each succeeding pulse, the band gradually moves downward through the column and the entire process of cold steam desorption of highly volatile materials, water soaking and further desorption of slightly less volatile materials, water evaporation towards the surface of the particles, and cold steam stripping to carry flavor concentrates further down the column will again be repeated.

Subjection to pulsed cold wet steam in this manner is continued until "breakthrough." As used herein, breakthrough is defined as that point in time at which the first flavor concentrate band has reached the bottom of the column.

Prior to breakthrough a colorless frost is collected in the first trap. The colorless frost is comprised largely of water-soluble alkaline and neutral aromatic materials as well as aromatic phenolic and/or acidic materials. This first colorless frost can be either discarded or, if desired, subjected to the process of U.S. Pat. No. 3,579,340, Strobel, issued May 18, 1971, and can be added back to conventional spray-dried or freeze-dried instant coffees to enhance their aroma and flavor.

Once breakthrough has occurred, a liquid flavor concentrate is collected in the first trap. Simultaneously with the collection of a liquid flavor concentrate in the first trap, highly volatile materials pass through that first trap without condensing and are carried to the second trap which is held at liquid nitrogen temperatures. In this second trap the aroma-bearing concentrate is condensed.

Preferably this flavor/aroma desorbing process is carried out while the entire system is subjected to downward sparging with an inert gas. The inert gas can be nitrogen, argon, helium, Freon ® or others. Preferably the inert gas is a combination of nitrogen and carbon dioxide which surprisingly provides a flavor enhancing effect in the subsequently separated flavor concentrate. This sparging feature aids in continual removal in a downward fashion of flavor- and aroma-carrying bodies. Where the column is being sparged in a downward manner with an inert gas and preferably with at least some carbon dioxide, carbon dioxide will condense along with aroma concentrate in the second trap. When the aroma condensate is to be collected in the second trap as an aroma concentrate, it is preferred that carbon dioxide sparging be employed because the carbon dioxide, along with the aroma-bearing materials, will solidify in the form of an aroma-$CO_2$ matrix in the second trap. This is highly desirable because the carbon dioxide will act as a diluent and protecting medium for the highly reactive aroma-bearing materials by separating portions of the aroma concentrate from each other.

It will be appreciated that the foregoing description of the preparation of the flavor and aroma concentrates optionally employed herein is subject to minor modifications as disclosed in U.S. Pat. No. 3,717,472, cited hereinabove.

The flavor and aroma concentrates prepared and recovered in the foregoing manner are ready for use to reconstitute or enrich coffee extracts decaffeinated in the manner of this invention.

In still another mode, mixed aroma flavor concentrates (AFC) and a relatively bland coffee extract can be prepared in the manner described in U.S. patent application Ser. No. 330,143, filed Feb. 6, 1973, to Strobel, entitled STABLE AROMA, FLAVOR AND AROMA FLAVOR PRODUCTS FROM AROMA- AND FLAVOR-BEARING SUBSTRATES, the disclosures of which are incorporated herein by reference. The bland coffee extract prepared in this manner can be decaffeinated in the manner described herein and recombined with the AFC to provide a superior decaf coffee.

It will be appreciated that in the foregoing processes, there is no substantial loss of flavor or aroma to the decaf solvent, since flavor and aroma materials are removed prior to decaffeination and are then reunited with the decaffeinated extract to form the final product.

The following examples illustrate the practice of this invention, but are not intended to be limiting thereof.

EXAMPLE I

Coffee beans are roasted in a standard roasting apparatus at a temperature of 200° C.–350° C. to a photovolt reading in the range of 60–80 (a "standard" roast). After quenching and grinding to a fine grind size, i.e., less than 20 mesh U.S. Standard Sieve, the coffee is ready for brewing. In the brewing procedure, the ground, roasted coffee is admixed with water at a rate of water:coffee of ca. 10:1 by weight. The water is brought to a boil for a period of about 2 minutes and filtered to remove coffee grounds.

The liquid coffee extract prepared in the foregoing manner is contacted with benzyl alcohol (1:1 vol. extract:benzyl alcohol) in a rocking autoclave. The liquids are rocked together for a period of about 20 hours, after which the caffeine-containing benzyl alcohol layer is separated from the decaffeinated coffee extract.

Liquid coffee extracts contacted with benzyl alcohol substantially in the manner of Example I have up to about 80% to about 97% by weight of caffeine removed, depending on the amount of caffeine originally present in the liquid extract.

Optionally, residual traces of benzyl alcohol are removed from the decaffeinated, aqueous coffee extract by washing with cyclopentane. Three successive washes (1:1 vol. cyclopentane:extract) remove organoleptically detectable amounts of the benzyl alcohol.

In the process of Example I, the benzyl alcohol decaf solvent is replaced by an equivalent amount of the following decaf solvent mixtures, respectively: 1:1 (wt.) benzyl alcohol:cyclohexane; 1:1 (wt.) benzyl alcohol:xylene (commercial, mixed o-, m-, and p-xylenes); and 1:1 (wt.) benzyl alcohol:isopropanol, and excellent decaf results are secured. Surprisingly, even thinner solvents which, themselves, are not good caffeine solvents do not interfere with the removal of caffeine by benzyl alcohol.

EXAMPLE II

A coffee column having a width of 5 inches and a length of 6 inches is placed in communication with two in-line condensing traps. The first trap is held at −76° C. using Dry Ice. The second trap is held at −195.8° C. with liquid nitrogen. A vacuum pump is connected to the system to provide vacuum pressures during operation.

900 Grams of roasted coffee beans are frozen in liquid nitrogen and ground to a grind size less than 20 mesh U.S. Standard Sieve. In order to purge the system of oxygen, 10 grams of solid carbon dioxide are placed on the ground beans and allowed to evaporate and be carried through the system to displace oxygen. The roasted and ground coffee is placed in the column and wet steam is pulsed downward through the column in the manner described hereinabove. The column is held at temperatures in the range of ca. 40° C.-60° C. by means of a water jacket. By proceeding in this manner, a liquid flavor concentrate is collected in the first trap. Simultaneously with the collection of the liquid flavor concentrate in the first trap, a solidified aroma frost comprising coffee aroma and carbon dioxide is formed in the second trap.

The substantially de-flavored and non-aromatic, ground roasted coffee beans are removed from the column and boiled with water to provide a caffeine-containing extract. This extract is decaffeinated with benzyl alcohol in the manner of Example I. After removal of the benzyl alcohol, the decaffeinated, aqueous extract is recombined with the flavor and aroma concentrates from the traps to provide an aromatic, flavorful, decaffeinated, reconstituted coffee beverage.

EXAMPLE III

The process for preparing aroma and flavor extracts is carried out in the general manner set forth in U.S. patent application Ser. No. 330,143, cited hereinabove. In the first step, a column charged with roasted, ground, flaked coffee is extracted (1 mm. Hg) using 100° C. water. In this first step of the extraction, an aroma/flavor "frost" is condensed in a liquid nitrogen trap.

In Step 2 of the process, extraction is continued to provide a second aroma/flavor concentrate "cut" (AFC) which is very aromatic and flavorful). This AFC cut is "trapped" at ca. dry ice temperatures. The AFC is then combined with the aroma/flavor frost to provide what amounts to substantially all of the desirable aroma and flavor materials from the ground, roasted coffee.

In Step 3 of the process, extraction with water is continued to provide a brown liquid coffee extract. This extract is relatively bland, inasmuch as substantially all flavor and aroma materials are removed during the first two steps of the process.

The bland coffee extract from Step 3 is decaffeinated using a 1:1 weight ratio benzyl alcohol:extract in the manner of Example I, above, and the decaffeinated extract is removed from contact with the benzyl alcohol. The decaffeinated extract is thereafter recombined with the mixed AFC and aroma/flavor frost to provide a reconstituted, aromatic and flavorful, decaffeinated coffee beverage.

In an alternate mode, the process of Example III is modified by extracting both the bland liquid coffee extract from Step 3 and the AFC cut using benzyl alcohol to remove caffeine therefrom. After separating the decaffeinated AFC cut and the decaffeinated liquid coffee extract from their respective portions of benzyl alcohol, all fractions are recombined to provide an aromatic and flavorful decaffeinated coffee beverage.

EXAMPLE IV

An enriched, decaffeinated coffee is prepared in the following manner.

Coffee beans are roasted, ground and brewed in the manner of Example I. The extract is decaffeinated using benzyl alcohol in the manner of Example I, with some unavoidable losses of flavor and aroma.

An aroma flavor concentrate (AFC) is separately prepared from a second batch of roasted beans in the manner of Example III. The decaffeinated liquid coffee extract prepared in the foregoing manner is enriched by admixing the AFC therewith to provide a superior decaffeinated coffee beverage.

As can be seen from the foregoing, the present process can be used to prepare enriched and/or reconstituted decaffeinated coffee, or the like, by combining a benzyl alcohol decaffeinated coffee extract, or the like, with the corresponding, separately prepared, flavor extract, aroma extract, or mixtures of flavor and aroma extracts. (By "corresponding extract" is meant coffee flavor and aroma extracts are used with decaffeinated coffee extracts, tea with tea, etc.). While it is not possible to specify the chemical identity and ratios of all flavor materials present in such enriched or reconstituted extracts, decaf coffees prepared in the manner of Examples II, III and IV provide excellent beverages.

EXAMPLE V

A decaffeinated, instant tea powder is prepared in the following manner.

Darjeeling tea is brewed in boiling water (50 parts water:1 part tea) to provide a strong tea extract. One liter of the tea extract is placed together with 1 liter of a 1:1 wt. benzyl alcohol/xylene solvent system in a 3-liter container and stirred for 24 hours to provide good contact between the aqueous and organic phases. After this time, the phases are allowed to separate and the aqueous, decaffeinated tea phase is drawn off.

The aqueous tea phase is washed twice with equal volumes of cyclohexane. The aqueous, decaffeinated tea is heated to dryness, with steam, under vacuum. The resulting product is a dry, decaffeinated instant tea powder of excellent flavor and aroma characteristics.

It will be appreciated that the benzyl alcohol solvent system used herein not only decaffeinates coffee, cocoa, and the like, but also serves concurrently to remove other xanthine-like materials therefrom. Accordingly, the terms "decaffeinate" and "decaf" as used in the specification and claims herein encompass the removal of these other xanthine materials (e.g., theobromine, theophylline, etc.) from liqud caffeine-containing extracts.

What is claimed is:

1. A process for decaffeinating a liquid caffeine-containing extract selected from the group consisting of coffee beans, cocoa beans, tea and cola nuts, comprising contacting said extract with a solvent system comprising a homogeneous mixture of benzyl alcohol and one or more organic liquid thinners for benzyl alcohol, and thereafter removing the decaffeinated extract from contact with the solvent system.

2. A process according to claim 1 wherein the solvent system comprises a mixture of benzyl alcohol and a non-chlorinated organic liquid thinner.

3. A process for decaffeinating a liquid caffeine-containing extract, comprising contacting said extract selected from the group consisting of coffee, cocoa, tea and cola nuts with a solvent system comprising a mixture of benzyl alcohol and a member selected from the group consisting of the xylenes and the liquid cycloalkanes, and thereafter removing the decaffeinated extract from contact with the solvent system.

4. A process according to claim 3 wherein the solvent system comprises a mixture of benzyl alcohol and a member selected from the group consisting of cyclopentane, cyclohexane, the xylenes, and mixtures thereof.

5. A process according to claim 4 wherein the solvent system comprises a mixture of benzyl alcohol and cyclohexane.

6. A process according to claim 5 wherein the solvent system comprises a mixture of benzyl alcohol and cyclohexane at a weight ratio in the range of from about 10:90 to about 90:10.

7. A process according to claim 6 wherein the solvent system comprises a mixture of benzyl alcohol and cyclohexane at a weight ratio of benzyl alcohol-cyclohexane in the range of from about 70:30 to about 60:40.

8. A process according to claim 4 wherein the solvent system comprises a mixture of benzyl alcohol and cyclopentane.

9. A process according to claim 8 wherein the solvent system comprises a mixture of benzyl alcohol and cyclopentane at a weight ratio in the range of from about 10:90 to about 90:10.

10. A process according to claim 9 wherein the solvent system comprises a mixture of benzyl alcohol and cyclopentane at a weight ratio of benzyl alcohol:cyclopentane in the range of from about 70:30 to about 60:40.

* * * * *